United States Patent
Eisen

(10) Patent No.: US 9,830,316 B2
(45) Date of Patent: *Nov. 28, 2017

(54) CONTENT AVAILABILITY FOR NATURAL LANGUAGE PROCESSING TASKS

(71) Applicant: International Business Machines Corporation, Armonk, NY (US)

(72) Inventor: Jeffrey N. Eisen, Newtown, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/627,044

(22) Filed: Jun. 19, 2017

(65) Prior Publication Data

US 2017/0286402 A1 Oct. 5, 2017

Related U.S. Application Data

(63) Continuation of application No. 14/106,324, filed on Dec. 13, 2013.

(51) Int. Cl.
G06F 17/21 (2006.01)
G06F 17/27 (2006.01)
G06F 17/24 (2006.01)
G06F 17/22 (2006.01)

(52) U.S. Cl.
CPC ........ *G06F 17/2785* (2013.01); *G06F 17/211* (2013.01); *G06F 17/2264* (2013.01); *G06F 17/24* (2013.01); *G06F 17/241* (2013.01); *G06F 17/27* (2013.01)

(58) Field of Classification Search
None
See application file for complete search history.

(56) References Cited

U.S. PATENT DOCUMENTS

| | | |
|---|---|---|
| 5,418,717 A | 5/1995 | Su et al. |
| 5,708,825 A | 1/1998 | Sotomayor |
| 5,960,448 A | 9/1999 | Reichek et al. |
| 6,052,663 A | 4/2000 | Kurzweil et al. |
| 6,336,124 B1 | 1/2002 | Alam et al. |
| 6,632,251 B1 | 10/2003 | Rutten et al. |
| 6,668,355 B1 | 12/2003 | Shiratori |
| 7,107,522 B1 | 9/2006 | Morgan et al. |
| 7,117,432 B1 | 10/2006 | Shanahan et al. |
| 7,412,389 B2 | 8/2008 | Yang |
| 7,549,118 B2 | 6/2009 | Shur et al. |
| 7,742,953 B2 | 6/2010 | King et al. |
| 7,812,860 B2 | 10/2010 | King et al. |

(Continued)

OTHER PUBLICATIONS

Ferres et al., "Evaluating a Tool for Improving Accessibility to Complex Visual Objects," Proceedings of the 12th International ACM SIGACCESS Conference on Computers and Accessibility, Orlando, FL, Oct. 2010, 8 pages.

(Continued)

*Primary Examiner* — Jialong He
(74) *Attorney, Agent, or Firm* — VanLeeuwen & VanLeeuwen; Reza Sarbakhsh

(57) ABSTRACT

An approach is provided to make content available to natural language processing (NLP) tasks. In the approach, a screen view of a document section is provided as input to a screen reader application. The screen reader application converts information displayed on the screen into a natural language format. A NLP operation is then performed on the natural language format.

18 Claims, 6 Drawing Sheets

(56) References Cited

U.S. PATENT DOCUMENTS

| | | |
|---|---|---|
| 7,844,898 B2 | 11/2010 | Ross et al. |
| 8,073,930 B2 | 12/2011 | Yee |
| 8,366,447 B2 | 2/2013 | Gordon et al. |
| 8,453,045 B2 | 5/2013 | Tanaka |
| 8,588,528 B2 | 11/2013 | Chapman et al. |
| 8,661,332 B2 | 2/2014 | Dunietz et al. |
| 8,812,946 B1 | 8/2014 | Kopylov et al. |
| 9,495,349 B2 | 11/2016 | Angell et al. |
| 2001/0047373 A1 | 11/2001 | Jones et al. |
| 2002/0178183 A1 | 11/2002 | Meding |
| 2002/0191848 A1 | 12/2002 | Boose et al. |
| 2003/0014445 A1 | 1/2003 | Formanek et al. |
| 2003/0115080 A1 | 6/2003 | Kasravi et al. |
| 2003/0167271 A1 | 9/2003 | Arnold et al. |
| 2003/0208502 A1 | 11/2003 | Lin |
| 2004/0117189 A1 | 6/2004 | Bennett |
| 2004/0194035 A1 | 9/2004 | Chakraborty |
| 2004/0199870 A1 | 10/2004 | Anderson |
| 2004/0260535 A1 | 12/2004 | Chen et al. |
| 2005/0050452 A1 | 3/2005 | Weitzel et al. |
| 2005/0108642 A1 | 5/2005 | Sinclair |
| 2005/0137843 A1 | 6/2005 | Lux |
| 2006/0015342 A1 | 1/2006 | Kurzweil et al. |
| 2006/0044619 A1 | 3/2006 | Namiki et al. |
| 2006/0092480 A1 | 5/2006 | Cui et al. |
| 2006/0143559 A1 | 6/2006 | Spielberg et al. |
| 2006/0217954 A1 | 9/2006 | Koyama et al. |
| 2007/0055931 A1 | 3/2007 | Zaima et al. |
| 2007/0094006 A1 | 4/2007 | Todhunter et al. |
| 2007/0179776 A1 | 8/2007 | Segond et al. |
| 2007/0211071 A1 | 9/2007 | Slotznick et al. |
| 2010/0057434 A1 | 3/2010 | Konno |
| 2011/0029443 A1 | 2/2011 | King et al. |
| 2011/0110599 A1 | 5/2011 | Sata et al. |
| 2011/0249284 A1 | 10/2011 | Seabright et al. |
| 2012/0192059 A1 | 7/2012 | Laskaris et al. |
| 2012/0288190 A1 | 11/2012 | Tang |
| 2012/0290288 A1 | 11/2012 | Ait-Mokhtar |
| 2013/0041892 A1 | 2/2013 | Bayer et al. |
| 2013/0124568 A1 | 5/2013 | Wang |
| 2013/0145241 A1 | 6/2013 | Salama |
| 2013/0174010 A1 | 7/2013 | Le Chevalier et al. |
| 2013/0174017 A1 | 7/2013 | Richardson et al. |
| 2013/0219257 A1 | 8/2013 | Carmeli et al. |
| 2013/0315485 A1 | 11/2013 | Blose et al. |
| 2013/0332815 A1 | 12/2013 | Gallo et al. |
| 2014/0006921 A1 | 1/2014 | Gopinath et al. |
| 2014/0108897 A1 | 4/2014 | Boutelle et al. |
| 2014/0250368 A1 | 9/2014 | Wineman et al. |
| 2014/0297269 A1 | 10/2014 | Qian et al. |
| 2014/0337008 A1 | 11/2014 | Morimoto et al. |
| 2015/0046797 A1 | 2/2015 | Li et al. |
| 2015/0052201 A1 | 2/2015 | Brooks et al. |
| 2015/0142418 A1 | 5/2015 | Byron et al. |
| 2015/0169545 A1 | 6/2015 | Eisen |
| 2015/0278298 A1 | 10/2015 | Boldyrev |

OTHER PUBLICATIONS

Carter et al., "The Common Accessibility Profile," Tech. Rep. No. TR2004-02, Department of Computer Science, University of Saskatchewan, Saskatoon, Saskatchewan, Canada, 2004, 9 pages.

"List of IBM Patents or Patent Applications Treated as Related," Letter from Leslie A. Van Leeuwen, Jun. 19, 2017, 1 page.

CONTENT AVAILABILITY FOR NATURAL LANGUAGE PROCESSING TASKS

BACKGROUND OF THE INVENTION

For computing tasks that require unstructured textual input for Natural Language Processing (NLP) tasks, it is often difficult to convert documents from a myriad of formats to "normal" sentences. For example, for a Question/Answer (QA) System that relies on volumes of unstructured sentences to parse in order to form the corpora during the ingestion process, documents that include diagrams provide great difficulty. Even if the diagram can be converted to a more textual format (e.g. HTML, etc.), the diagram can prove very difficult for the system to correctly interpret the semantics. One common approach is to just ignore diagrams and images and text that is structured in ways other than sentences. This tends to be easy to implement, but some content that might be very important is discarded. Another approach is to write a new converter for each of the many types of content, such as each type of diagram. While effective, this can be costly and time consuming as the types and layout of content multiplies.

SUMMARY

An approach is provided for making various types of content available for Natural Language Processing (NLP) tasks. In the approach, a screen view of a document section is provided as input to a screen reader application. The screen reader application converts information displayed on the screen into a natural language format. A NLP operation is then performed on the natural language format. In one embodiment, the NLP operation is carried out by a question and answer (QA) system. In another embodiment, before the document section is input to the screen reader application, the overall document that includes the document section is received and the document section is identified as a section that is incompatible with one or more native converters used to convert document contents.

In one embodiment, the input document that includes a number of document sections is received. A set of document sections is identified that are compatible with native converters used to convert document contents, and this set of document sections is converted using the native converters. Another set of document sections is identified that are incompatible with the native converters, and this set is converted to the NLP format by inputting screen views corresponding to this set of document sections to the screen reader application. In a further embodiment, the identification of the incompatible document sections includes detecting a content type corresponding to the incompatible document sections, with the content type being either a diagram, a table, a picture, or a non-textual document type. In another further embodiment, the process receives audible speech as an input from the screen reader application. The audible speech input is then input to a speech recognition application that converts the audible speech to a textual NLP format. In another further embodiment, the process merges document sections converted using the native document converters and the document sections converted using the screen reader application with the resulting merged document being in the same order as the original input document.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
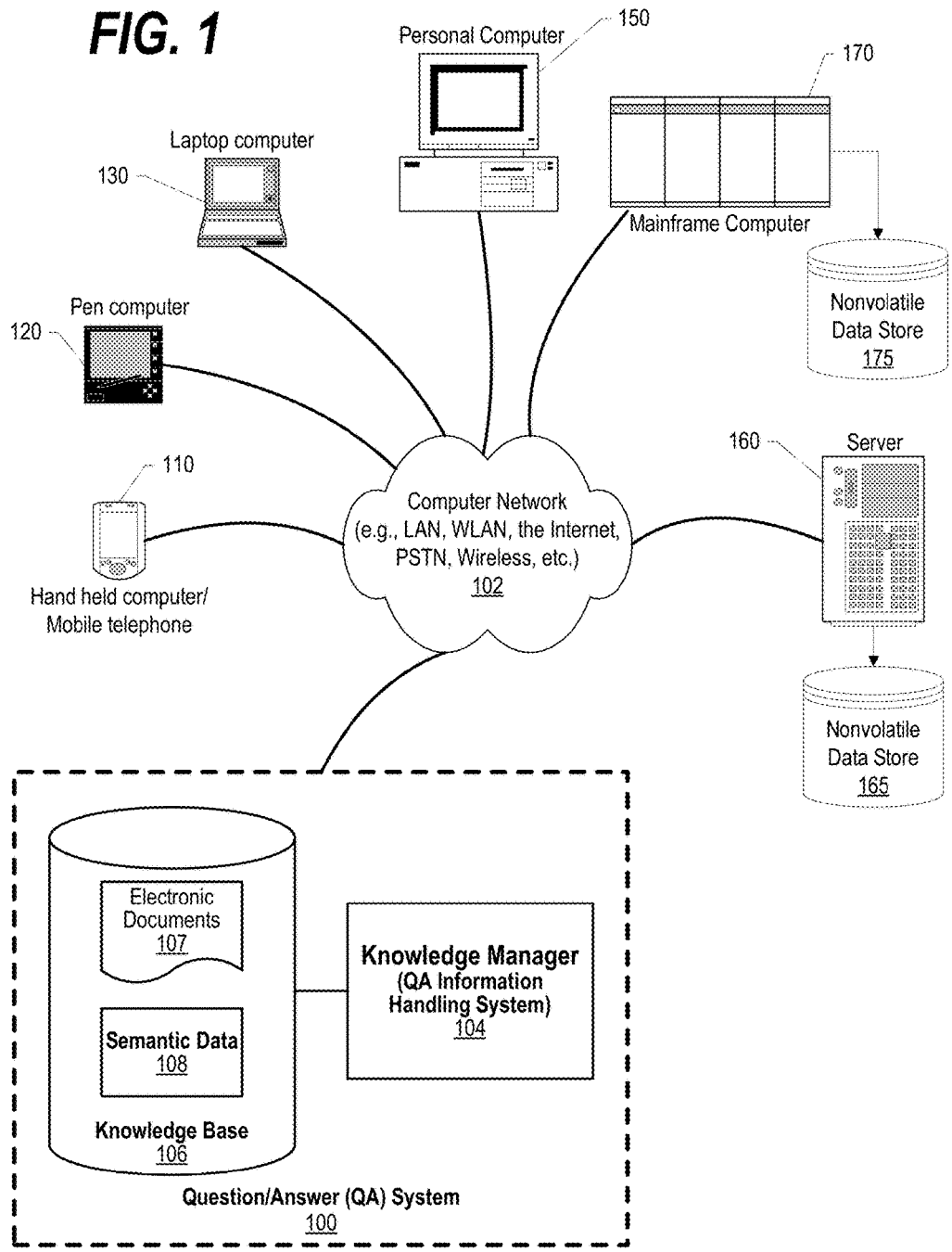
FIG. 1 depicts a network environment that includes a knowledge manager that utilizes a knowledge base.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer, server, or cluster of servers. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 depicts a schematic diagram of one illustrative embodiment of a question/answer creation (QA) system 100 in a computer network 102. Knowledge manager 100 may include a computing device 104 (comprising one or more processors and one or more memories, and potentially any other computing device elements generally known in the art including buses, storage devices, communication interfaces, and the like) connected to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. Knowledge manager 100 and network 102 may enable question/answer (QA) generation functionality for one or more content users. Other embodiments of knowledge manager 100 may be used with components, systems, sub-systems, and/or devices other than those that are depicted herein.

Knowledge manager 100 may be configured to receive inputs from various sources. For example, knowledge manager 100 may receive input from the network 102, a corpus of electronic documents 106 or other data, a content creator 108, content users, and other possible sources of input. In one embodiment, some or all of the inputs to knowledge manager 100 may be routed through the network 102. The various computing devices 104 on the network 102 may include access points for content creators and content users. Some of the computing devices 104 may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in a document 106 for use as part of a corpus of data with knowledge manager 100. The document 106 may include any file, text, article, or source of data for use in knowledge manager 100. Content users may access knowledge manager 100 via a network connection or an Internet connection to the network 102, and may input questions to knowledge manager 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. In one embodiment, the process sends well-formed questions (e.g., natural language questions, etc.) to the knowledge manager. Knowledge manager 100 may interpret the question and provide a response to the content user containing one or more answers to the question. In some embodiments, knowledge manager 100 may provide a response to users in a ranked list of answers.

In some illustrative embodiments, knowledge manager 100 may be the IBM Watson™ QA system available from International Business Machines Corporation of Armonk, N.Y., which is augmented with the mechanisms of the illustrative embodiments described hereafter. The IBM Watson™ knowledge manager system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The IBM Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the IBM Watson™ QA system. The statistical model may then be used to summarize a level of confidence that the IBM Watson™ QA system has regarding the evidence that the potential response, i.e. candidate answer, is inferred by the question. This process may be repeated for each of the candidate answers until the IBM Watson™ QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 100. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
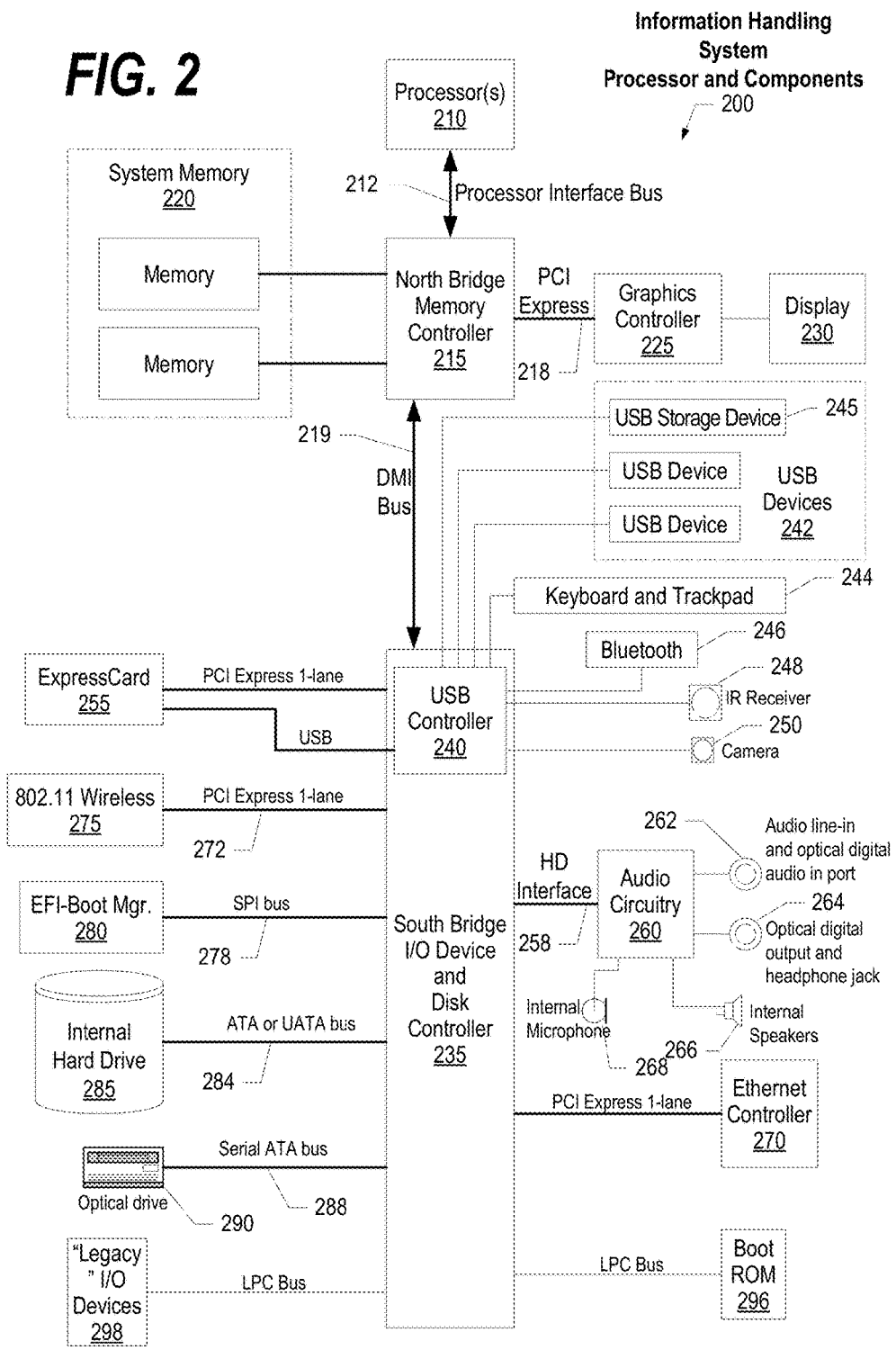
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 0.802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

FIGS. 3-6 depict an approach that can be executed on an information handling system, to make various types of content available for Natural Language Processing (NLP) tasks used by a Question/Answer (QA) system, such as QA System 100 shown in FIG. 1. In the approach, a screen view of a document section is provided as input to a screen reader application. The screen reader application converts information displayed on the screen into a natural language format. A NLP operation is then performed on the natural language format. In one embodiment, the NLP operation is carried out by a question and answer (QA) system. In another embodiment, before the document section is input to the screen reader application, the overall document that includes the document section is received and the document section is identified as a section that is incompatible with one or more native converters used to convert document contents to the NLP format. In one embodiment, the input document that includes a number of document sections is received. A set of document sections is identified that are compatible with native converters used to convert document contents, and this set of document sections is converted using the native converters. Another set of document sections is identified that are incompatible with the native converters, and this set is converted to the NLP format by inputting screen views corresponding to this set of document sections to the screen reader application. In a further embodiment, the identification of the incompatible document sections includes detecting a content type corresponding to the incompatible document sections, with the content type being either a diagram, a table, a picture, or a non-textual document type. In another further embodiment, the process receives audible speech as an input from the screen reader application. The audible speech input is then input to a speech recognition application that converts the audible speech to a textual NLP format. In another further embodiment, the process merges document sections converted using the native document converters and the document sections converted using the screen reader application with the resulting merged document being in the same order as the original input document.

While screen reader technology has existed for many years, the purpose of screen reader applications has been to assist sight-impaired individuals to understand information that is displayed to them on a display screen. Screen reader applications convey the information by converting the text that is displayed on the screen to an audible version that can be heard, rather than seen, by the user. Because sight-impaired users of screen reader technology have difficulty reading text-based information, screen reader applications are focused on outputting audible outputs to users rather than outputting the displayed information to a textual format. Likewise, NLP applications have been in existence for quite some time primarily rely on textual inputs to digest and process to perform various natural language operations. Because the longstanding audible output formats from screen reader applications is divergent from the textual inputs often required by NLP input processes, combining these two distinct technologies to provide inputs to NLP operations is not apparent and has not been performed prior to the approach described herein.

Figure 3:
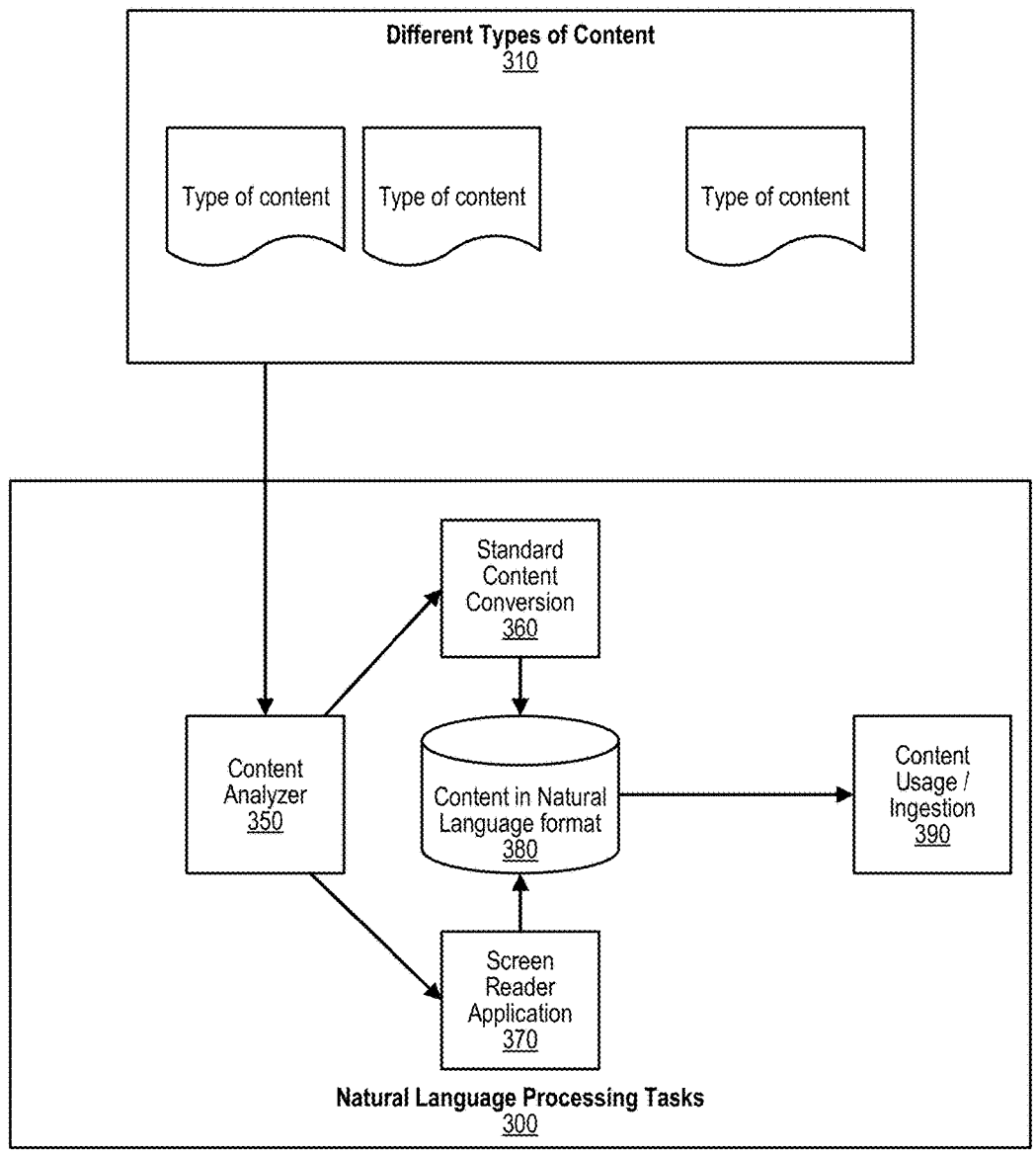
FIG. 3 is a component diagram depicting the various components used in making various types of content available for Natural Language Processing (NLP) tasks.

FIG. 3 is a component diagram depicting the various components used in making various types of content available for Natural Language Processing (NLP) tasks. NLP tasks 300 include content usage and/or ingestion of content by the NLP tasks, or operations, such as a QA system. Different types of content 310 are used and/or ingested by the NLP operations. These contents can include general text, diagrams, tables, pictures, and additional non-textual document types of content.

Content analyzer 350 operates to analyze document sections. An input document can include any number of document sections. For some types of content, such as document sections that include general text, standard content conversion 360 is used to convert the contents into an NLP format. The standard content reader includes one or more native converters used to convert contents from these document sections into the NLP format. The converted content, now in an NLP format, is stored in data store 380. NLP formatted content may also include specialized content, such as software code, that is found in document sections including tables, diagrams, etc., and converted to a textual format.

Content analyzer 350 also identifies document sections that include content of a type that is incompatible with being converted using the native converters. For these document sections, the content analyzer inputs screen views of the document sections to screen reader application 370, such as a screen reader application designed to assist sight-impaired users. The screen reader application converts information displayed on the display screen into a natural language format. In one embodiment, the screen reader application stores the natural language format in a textual format that can be stored in a data store. In a second embodiment, the screen reader application outputs the natural language format as audible speech that can be heard and understood by a user. In this second embodiment, a speech recognition application is used to receive the audible speech as an input and output a textual form of the speech that is in a NLP format. The NLP format resulting from screen reader application 370 is stored in data store 380.

In one embodiment, if the input document includes some document sections that are compatible with the native converters and converted using standard conversion 360 and other document sections that are incompatible with the native converters and consequently converted using screen reader application 370, a merging process is used to merge the converted sections of the document so that they appear in NLP format 380 in the same order that they appeared in the original input document. NLP formatted content that is stored in data store 380 is provided as an input to an NLP operation, such as NLP content usage/ingestion operation 390. The NLP operation may be an operation performed by a QA system.

Figure 4:
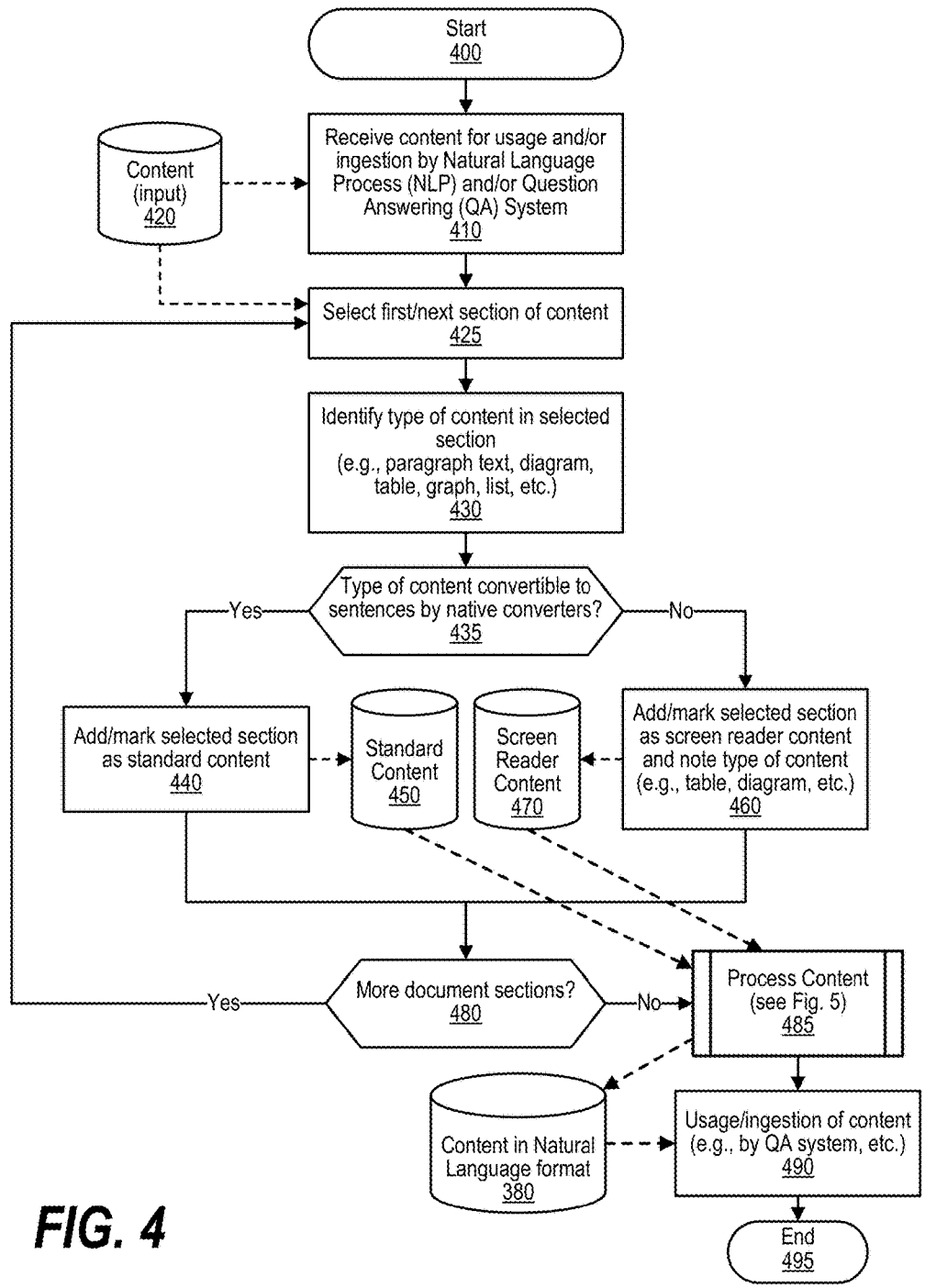
FIG. 4 is a depiction of a flowchart showing the logic used to make various types of content available for Natural Language Processing (NLP) tasks.

FIG. 4 is a depiction of a flowchart showing the logic used to make various types of content available for Natural Language Processing (NLP) tasks. Processing commences at 400 whereupon, at step 410, the process receives input document 420 that is content that may include any number of document sections. The processing shown in FIG. 4 operates to identify document sections that are compatible with native converters that are used to convert contents to the NLS format, as well as identify document sections incompatible with the native converters. Input document 420 may be for usage by a QA system or ingestion by the QA system to add content to the QA system's corpus.

At step 425, the process selects the first document section from input document 420 is selected. In one embodiment, a document section is a section that is of the same document type so that when a different document type is encountered, a boundary between two document sections is identified. For example, if the first two pages of a document are standard text followed by a diagram (e.g., a flowchart, etc.), the first two pages would be treated as the first document section and the diagram would be treated as the second document section.

At step 430, the process identifies the type of content that is in selected document section (e.g., paragraph text, diagram, table, graph, list, picture, other non-textual content, etc.). A decision is made by the process as to whether native converters exist to convert the identified type of content found in the selected document section to the NLP format (decision 435). If decision 435 determines that the selected document section can be converted by a native document converter, then decision 435 branches to the "yes" branch whereupon, at step 440, the selected document section is added or otherwise marked as standard content and added to data store 450. On the other hand, if decision 435 determines that the selected document section cannot be converted by a native document converter, then decision 435 branches to the "no" branch whereupon, at step 460, the selected document section is added or otherwise marked as screen reader content and added to data store 470 to be processed by a screen reader application. In addition, at step 460, the type of content found (e.g., type of diagram, picture, etc.) is noted so that an appropriate screen reader application can be selected if multiple screen reader applications are available.

A decision is made by the process as to whether there are additional document sections in the input document to process (decision 480). If there are more document sections to process, then decision 480 branches to the "yes" branch which loops back to step 425 to select and process the next document section from input document 420. This looping continues until there are no more document sections to process, at which point decision 480 branches to the "no" branch whereupon, at predefined process 485, the content is processed and converted to the NLP format which is stored in data store 380. Once the content is stored in NLP format (data store 380), at step 490, an NLP operation is performed, such as usage of the NLP format or ingestion of the NLP formatted contents (e.g., by a QA system, etc.). Processing thereafter ends at 495.

Figure 5:
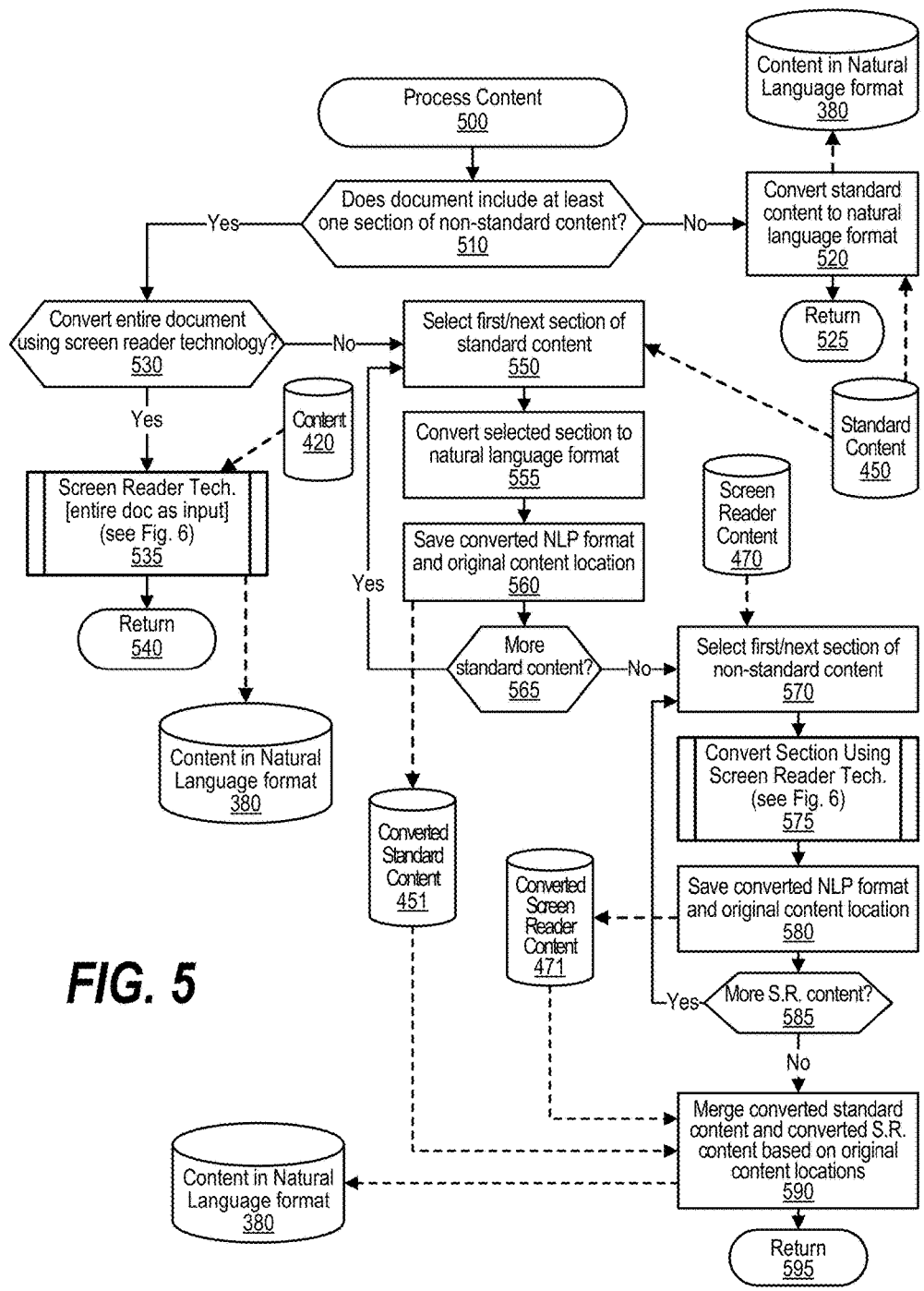
FIG. 5 is a depiction of a flowchart showing the logic used to process the content.

FIG. 5 is a depiction of a flowchart showing the logic used to process the content. Content processing commences at 500 whereupon a decision is made by the process as to whether there is at least one document section that is incompatible with the system's native converters (decision 510). If the entire input document (all document sections or sole document section) can be converted using the native converters, then decision 510 branches to the "no" branch whereupon, at step 520, the entire document is converted to the NLP format using one or more native converters with the resulting NLP formatted contents stored in data store 380. Processing then returns to the calling routine (see FIG. 4) at 525.

Returning to decision 510, if at least one section of the document is incompatible with the native converters, then decision 510 branches to the "yes" branch to process the content of the document. A decision is made by the process as to whether to convert the entire input document (all document sections) using a screen reader application (decision 530). For example, if a majority of the document is incompatible with the native converters then it may be more expeditious to convert the entire document using a screen reader application. If the entire document is being converted using a screen reader application, then decision 530 branches to the "yes" branch whereupon, at predefined process 535, the entire document is converted using one or more screen reader applications (see FIG. 6 and corresponding text for processing details). Processing then returns to the calling routine (see FIG. 4) at 540. On the other hand, if some document sections are being converted using native converters and others are being converted using a screen reader application, then decision 530 branches to the "no" branch for further processing.

At step 550, the process selects the first document section identified as being compatible with one or more native converters and previously stored in data store 450. At step 555, the process converts the selected document section to the NLP format using one of the native converters. At step 560, the process stores the converted document section, now in the NLP format, to converted content data store 451. A decision is made by the process as to whether there is additional content to be converted using the native converters (decision 565). If there are additional sections to convert using the native converters, then decision 565 branches to the "yes" branch which loops back to select and convert the next document section from data store 450 as described above. This looping continues until all document sections from data store 450 have been processed, at which point decision 565 branches to the "no" branch to process the document sections that are incompatible with the native converters.

At step 570, the process selects the first document section identified as being incompatible with the native converters and previously stored in data store 470. At predefined process 575, the process converts the selected document section to the NLP format using a screen reader application (see FIG. 6 and corresponding text for processing details). At step 580, the process stores the converted document section, now in the NLP format, to converted content data store 471. A decision is made by the process as to whether there is additional content to be converted using a screen reader application (decision 585). If there are additional sections to convert using a screen reader application, then decision 585 branches to the "yes" branch which loops back to select and convert the next document section from data store 470 as described above. This looping continues until all document sections from data store 470 have been processed, at which point decision 585 branches to the "no" branch. At step 590, the process merges the document sections converted using the native converters (stored in data store 451) with the document sections converted using a screen reader application (stored in data store 471). The resulting merged NLP formatted output has document sections that are in the same order as the original input document. The resulting merged NLP formatted output is stored in data store 380. Processing then returns to the calling routine (see FIG. 4) at 595.

Figure 6:
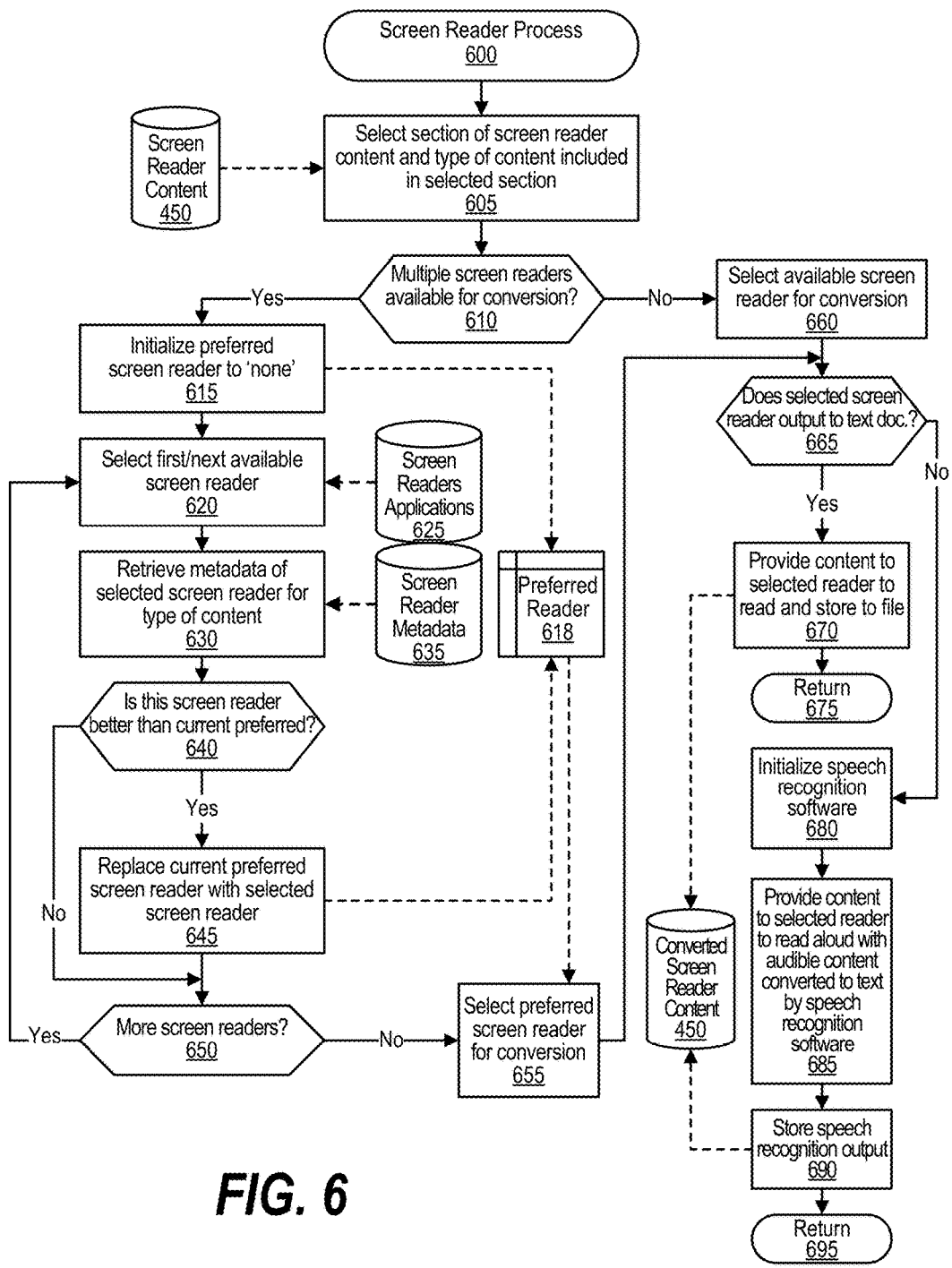
FIG. 6 is a depiction of a flowchart showing the logic performed the process that utilizes a screen reader to convert a section of a document to a converted form suitable for Natural Language Processing (NLP) tasks.

FIG. 6 is a depiction of a flowchart showing the logic performed the process that utilizes a screen reader to convert a section of a document to a converted form suitable for Natural Language Processing (NLP) tasks. Screen reader processing commences at 600 whereupon, at step 605, the process selects a document section as well as the content type of the selected section (e.g., diagram, table, picture, other non-textual document type, etc.). A decision is made by the process as to whether there are multiple screen reader applications that are available for use in converting the selected document section to NLP formatted content (decision 610). If multiple screen readers area available, then decision 610 branches to the "yes" branch to select the best (preferred) screen reader application to use in converting the selected document section. A particular screen reader application may be proficient in processing a particular type of content, such as diagrams, yet ineffectual in processing a different type of content, such as tables. Conversely, another screen reader application may be proficient in processing tables, yet ineffectual in processing diagrams.

At step 615, the process initializes the preferred screen reader application to 'none' and stores the initial value in memory area 618. At step 620, the process selects the first available screen reader application from data store 625. At step 630, the process retrieves screen reader metadata from data store 635. The screen reader metadata includes data regarding the selected screen reader application, with the metadata including the capabilities (e.g., rating values, etc.) of the selected screen reader application in converting various types of document content. A decision is made by the process as to whether the selected screen reader application is better than the current preferred screen reader application (decision 640). Since the preferred screen reader application was initialized to 'none', the first selected screen reader application is deemed better and replaces the initial value. During evaluation of subsequent screen reader applications, the capabilities of the selected screen reader application are compared to the capabilities of the current best (preferred) screen reader application in converting the document content included in the selected document section. If the selected screen reader application is better than the current best (preferred) screen reader application in converting the document content included in the selected document section, then decision 640 branches to the "yes" branch whereupon, at step 645, the current preferred screen reader application is replaced with the selected screen reader application in memory area 618. On the other hand, if the selected screen reader application is not better than the current best (preferred) screen reader application in converting the document content included in the selected document section, then decision 640 branches to the "no" branch bypassing step 645. A decision is made by the process as to whether there are more screen reader applications to process (decision 650). If there are more screen reader applications to process, then decision 650 branches to the "yes" branch which loops back to select the next screen reader application and evaluate/compare it to the current preferred screen reader application as described above. This looping continues until all of the screen reader applications have been evaluated and compared, at which point decision 650 branches to the "no" branch and, at step 655, the preferred screen reader for converting this type of content is selected from memory area 618.

Returning to decision 610, if multiple screen reader applications are not available, then decision 610 branches to the "no" branch whereupon, at step 660, the process selects the single available screen reader application that is available to use in converting the document section. After a screen reader application has been selected, either by identifying the preferred screen reader application if multiple readers are available or by selecting the single available screen reader application, then a decision is made by the process as to whether the selected screen reader application supports outputting the results of the screen reader application to a text document (decision 665). If the selected screen reader application supports outputting the results of the screen reader application to a text document, then decision 665 branches to the "yes" branch whereupon, at step 670, the process provides the contents of the selected document section to the screen reader to process and store in an output file (data store 450). In one embodiment, the document section is provided to the screen reader application by displaying a first screen view of the document section at the beginning of the document section and having the screen reader application process the content displayed on the display screen. A screen view is that portion of the document section currently being displayed on a display device. If more content needs to be processed from the document section, the process scrolls so that the next part of the document section appears on a second screen view and the screen reader application processes the next displayed screen view. This continues until the entire document section has been displayed in a series of screen views, with each screen view being processed by the screen reader application and the NLP formatted contents resulting from the screen reader application being stored (appended to) data store 450. After the entire document section has been processed by step 670, processing returns to the calling routine (see FIG. 5) at 675.

Returning to decision 665, if the selected screen reader application does not support outputting results to an output file, as many screen reader applications are designed to provide audible speech to sight-impaired users, then decision 665 branches to the "no" branch to process the document section using the selected screen reader application and speech recognition software. At step 680, the process initializes the speech recognition software that will be used to perform speech recognition on the audible output from the screen reader application. In one embodiment, the document section is provided to the screen reader application by displaying a first screen view of the document section at the beginning of the document section and having the screen reader application process the content displayed on the display screen. The processing of the displayed screen view results in audible speech of the screen view of the document section. The speech recognition software then converts the audible speech to text and stores the text in a temporary document. If more content needs to be processed from the document section, the process scrolls so that the next part of the document section appears on a second screen view and the screen reader application processes the next displayed screen view with the second screen view being output by the screen reader application as audible speech that is again converted to text and stored in the temporary document by the speech recognition software. This process continues until the entire document section has been displayed in a series of screen views, with each screen view being processed by the screen reader application producing audible speech output, and the speech recognition software has converted all of the audible speech output to text stored in the temporary text document. When the entire document section has been processed by the screen reader application and the speech recognition software, the document section will be NLP formatted contents stored in a temporary text document. At step 690, the process stores the data from the temporary document to data store 450. Processing then returns to the calling routine (see FIG. 5) at 695.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, in an information handling system comprising a processor and a memory, of making content available to natural language processing (NLP) tasks, the method comprising:
   in response to determining that a document section comprises non-textual image data, converting the document section into a natural language format, wherein the natural language format comprises textual data compatible with the NLP tasks, and wherein the converting comprises:
      providing a screen view of the document section to a screen reader application;
      in response to the providing, receiving, from the screen reader application, an audible speech output; and
      providing the audible speech output to a speech recognition application, wherein the speech recognition application converts the audible speech input into a natural language textual output that describes the non-textual image data; and
   performing a NLP operation on the natural language textual output.

2. The method of claim 1 wherein the NLP operation is carried out by a question and answer system.

3. The method of claim 1 further comprising:
   prior to the converting:
      receiving a document that includes the document section; and
      identifying that the document section is incompatible with one or more native converters used to convert document contents to the natural language format.

4. The method of claim 1 further comprising:
   receiving an input document that includes a plurality of document sections including the document section comprising non-textual image data;
   identifying a first set of document sections from the plurality of document sections that are compatible with one or more native converters used to convert document contents to the natural language format;
   converting the first set of document sections to the natural language format using the one or more native converters;
   identifying a second set of document sections from the plurality of document sections that are incompatible with the one or more native converters, wherein the second set of document sections includes the document section comprising non-textual image data; and
   converting the second set of document sections to the natural language format by providing one or more screen views corresponding to each of the second set of document sections to the screen reader application, receiving one or more audible speech outputs from the screen reader application, providing the one or more audible speech outputs to the speech recognition application, and receiving one or more natural language textual outputs that describe the non-textual image data.

5. The method of claim 4 wherein the identifying the second set of document sections further comprises:
   detecting a content type corresponding to one or more document sections included in the second set of document sections, wherein the detected content type is selected from a group consisting of a diagram, a table, a picture, and a non-textual document type.

6. The method of claim 4 further comprising:
   merging the converted first set of document sections and the converted second set of document sections to a natural language output file, wherein a merge order of the first and second set of converted document sections in the natural language output file is consistent with an original order of the plurality of document sections found in the input document.

7. An information handling system comprising:
   one or more processors;
   a memory coupled to at least one of the processors;
   a display; and
   a set of instructions stored in the memory and executed by at least one of the processors to make content available to natural language processing (NLP) tasks, wherein the set of instructions perform actions of:

in response to determining that a document section comprises non-textual image data, converting the document section into a natural language format, wherein the natural language format comprises textual data compatible with the NLP tasks, and wherein the converting comprises:
  providing a screen view of the document section to a screen reader application;
  in response to the providing, receiving, from the screen reader application, an audible speech output; and
  providing the audible speech output to a speech recognition application, wherein the speech recognition application converts the audible speech input into a natural language textual output that describes the non-textual image data; and
performing a NLP operation on the natural language textual output.

8. The information handling system of claim 7 wherein the NLP operation is carried out by a question and answer system.

9. The information handling system of claim 7 wherein the actions further comprise:
  prior to the converting:
    receiving a document that includes the document section;
    identifying that the document section is incompatible with one or more native converters used to convert document contents to the natural language format.

10. The information handling system of claim 7 wherein the actions further comprise:
  receiving an input document that includes a plurality of document sections including the document section comprising non-textual image data;
  identifying a first set of document sections from the plurality of document sections that are compatible with one or more native converters used to convert document contents to the natural language format;
  converting the first set of document sections to the natural language format using the one or more native converters;
  identifying a second set of document sections from the plurality of document sections that are incompatible with the one or more native converters, wherein the second set of document sections includes the document section comprising non-textual image data; and
  converting the second set of document sections to the natural language format by providing one or more screen views corresponding to each of the second set of document sections to the screen reader application, receiving one or more audible speech outputs from the screen reader application, providing the one or more audible speech outputs to the speech recognition application, and receiving one or more natural language textual outputs that describe the non-textual image data.

11. The information handling system of claim 10 wherein the identifying the second set of document sections further comprises:
  detecting a content type corresponding to one or more document sections included in the second set of document sections, wherein the detected content type is selected from a group consisting of a diagram, a table, a picture, and a non-textual document type.

12. The information handling system of claim 10 wherein the actions further comprise:
  merging the converted first set of document sections and the converted second set of document sections to a natural language output file, wherein a merge order of the first and second set of converted document sections in the natural language output file is consistent with an original order of the plurality of document sections found in the input document.

13. A computer program product stored in a computer readable storage medium, comprising computer instructions that, when executed by an information handling system, causes the information handling system to make content available to natural language processing (NLP) tasks by performing actions comprising:
  in response to determining that a document section comprises non-textual image data, converting the document section into a natural language format, wherein the natural language format comprises textual data compatible with the NLP tasks, and wherein the converting comprises:
    providing a screen view of the document section to a screen reader application;
    in response to the providing, receiving, from the screen reader application, an audible speech output; and
    providing the audible speech output to a speech recognition application, wherein the speech recognition application converts the audible speech input into a natural language textual output that describes the non-textual image data; and
  performing a NLP operation on the natural language textual output.

14. The computer program product of claim 13 wherein the NLP operation is carried out by a question and answer system.

15. The computer program product of claim 13 wherein the actions further comprise:
  prior to the converting:
    receiving a document that includes the document section;
    identifying that the document section is incompatible with one or more native converters used to convert document contents to the natural language format.

16. The computer program product of claim 13 wherein the actions further comprise:
  receiving an input document that includes a plurality of document sections including the document section comprising non-textual image data;
  identifying a first set of document sections from the plurality of document sections that are compatible with one or more native converters used to convert document contents to the natural language format;
  converting the first set of document sections to the natural language format using the one or more native converters;
  identifying a second set of document sections from the plurality of document sections that are incompatible with the one or more native converters, wherein the second set of document sections includes the document section comprising non-textual image data; and
  converting the second set of document sections to the natural language format by providing one or more screen views corresponding to each of the second set of document sections to the screen reader application, receiving one or more audible speech outputs from the screen reader application, providing the one or more audible speech outputs to the speech recognition application, and receiving one or more natural language textual outputs that describe the non-textual image data.

17. The computer program product of claim 16 wherein the identifying the second set of document sections further comprises:
- detecting a content type corresponding to one or more document sections included in the second set of document sections, wherein the detected content type is selected from a group consisting of a diagram, a table, a picture, and a non-textual document type.

18. The computer program product of claim 16 wherein the actions further comprise:
- merging the converted first set of document sections and the converted second set of document sections to a natural language output file, wherein a merge order of the first and second set of converted document sections in the natural language output file is consistent with an original order of the plurality of document sections found in the input document.

\* \* \* \* \*